(12) United States Patent
McIntire (10) Patent No.: US 10,261,163 B1
(45) Date of Patent: Apr. 16, 2019

(54) LOW FREQUENCY SOUND SENSOR ARRAY FOR POSITIONING AND METHODS OF USING SAME

(71) Applicant: The United States of America as represented by the Secretary of the Air Force, Washington, DC (US)

(72) Inventor: John P. McIntire, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 124 days.

(21) Appl. No.: 15/486,550

(22) Filed: Apr. 13, 2017

(51) Int. Cl.
*G01S 3/808* (2006.01)

(52) U.S. Cl.
CPC ................... *G01S 3/808* (2013.01)

(58) Field of Classification Search
CPC ...................................................... G01S 3/808
See application file for complete search history.

(56) References Cited

U.S. PATENT DOCUMENTS

| | | | |
|---|---|---|---|
| 6,097,296 A | 8/2000 | Garza et al. | |
| 7,016,785 B2 | 3/2006 | Makela et al. | |
| 7,394,723 B2 | 7/2008 | Rubin | |
| 8,401,217 B2 | 3/2013 | Shams et al. | |
| 8,671,763 B2 | 3/2014 | Zuckerwar et al. | |
| 2009/0022341 A1* | 1/2009 | Shams | G01H 11/02 381/174 |
| 2014/0313857 A1* | 10/2014 | Horton | G01S 5/18 367/117 |
| 2015/0160333 A1* | 6/2015 | Kim | G01S 7/52004 367/13 |
| 2016/0054459 A1 | 2/2016 | Kim | |
| 2016/0138965 A1 | 5/2016 | Beidermann | |

OTHER PUBLICATIONS

"NASA Langley Researchers Nab Invention of the Year for Infrasound Detection System", Jul. 25, 2014, Joe Atkinson, NASA Langley Research Center, 3 pages.

* cited by examiner

*Primary Examiner* — Daniel Pihulic
(74) *Attorney, Agent, or Firm* — AFMCLO/JAZ; Jeff Moore (57) ABSTRACT

A system and method of using the system are provided. The system can include at least one source, a plurality of sensors, and a processing device. The source can emit one or more low frequency sounds. The sensors can sense the low frequency sounds and transform the low frequency sounds into one or more signals including a plurality of data values. The processing device can be communicatively operable with the sensors to receive the signals and determine positioning information of the sensors based on the data values.

18 Claims, 6 Drawing Sheets

LOW FREQUENCY SOUND SENSOR ARRAY FOR POSITIONING AND METHODS OF USING SAME

GOVERNMENT INTEREST

The invention described herein may be manufactured and used by or for the Government of the United States for all government purposes without the payment of any royalty.

BACKGROUND

Field of the Invention

The embodiments disclosed herein generally relate to systems and methods for using low frequency sounds for positioning purposes, including direction finding and distances from a low frequency source.

Background of the Invention

Low frequency sound, such as infrasound, can travel great distances with little attenuation. Infrasound is a sound wave in a low frequency band between about 0.01 and 20 Hz, which can be lower than an audible frequency for humans. Sources of infrasound can be supersonic air-planes, explosions, industrial machinery, air handling systems, and wind generators whose moving rotor blades induce a compression of the air against the tower during passage producing rhythmical low-frequency vibrations. Heavy vehicle traffic such as on bridges can also generate infrasound. Further sources can be movements of boats, rough seas, volcanic eruption, typhoon, landslide, and earthquakes.

Interest in detecting low frequency sound and infrasound has led to recent advances in developing detectors. For example, U.S. Pat. No. 8,401,217, issued Mar. 19, 2013, discloses a portable infrasonic detection system including an infrasonic electret microphone and infrasonic windscreen where multiple microphones can be used in an array to determine the direction of an infrasonic signal. U.S. Patent Application Publication No. 2016/0054459, published on Feb. 25, 2016, is also directed to an apparatus for detecting infrasound that uses a sound wave detector and a sound wave filter. The sound wave detector includes a diaphragm as part of a capacitor that responds to a sound wave, when an interval between the diaphragm and an electrode structure is changed, a voltage is generated and a voltage change may be output, thereby detecting the sound.

The above information disclosed in this Background section is only for enhancement of understanding of the background of the disclosure and therefore it may contain information that does not form any part of the prior art nor what the prior art may suggest to a person of ordinary skill in the art.

BRIEF SUMMARY OF THE INVENTION

In view of the foregoing, an embodiment herein provides a system to find a direction to a geospatial location of a low frequency sound source. Another embodiment provides a system to find a direction to a geospatial location of an infrasound sound source. Another embodiment provides a method of geospatial positioning.

An exemplary embodiment discloses a system, comprising at least one source configured to emit one or more low frequency sounds; a plurality of sensors configured to sense the one or more low frequency sounds and to transform the one or more low frequency sounds into one or more signals comprising a plurality of data values; and a processing device communicatively operable with the plurality of sensors and configured to receive the one or more signals and to determine positioning information of the plurality of sensors based on the plurality of data values.

In the embodiment, the one or more low frequency sounds can have a frequency of about 200 Hz or below. The plurality of sensors can include at least three sensors. The sensors can include one or more of a pressure sensor, a microphone, and a combination thereof. The source can be at a first geospatial location and the positioning information can include any of a direction to and a distance from the first geospatial location.

In the embodiment, the sensors can include an atmospheric shield. The atmospheric shield can include any of a wind shield, a moisture shield, a cushioning shield, a thermal shield, and a light shield. The sensors can be portable and the system can include an enclosable volume configured to stow the sensor during transport, and the atmospheric shield can include a hose and a foam tip configured to protrude from the enclosable volume during operation.

In the embodiment, the processing device can receive the signals during a predefined collection period, derive one or more of amplitude and frequency values from the plurality of data values, record a timestamp for at least a subset of the one or more of amplitude and frequency values, and determine positioning information based on the timestamps and the one or more amplitude and frequency values.

In the embodiment, the sensors can include a plurality of sensor pairs, and the processing device can compute one or more of the following: a time-difference-of arrival (TDOA) for at least one pair of sensors; an angle-of-arrival estimate for at least one pair of sensors; and compass bearings to the source based on a geometric configuration of the sensors to provide an estimate of the at least one low frequency sound source compass direction.

In the embodiment, the low frequency sounds can be infrasound having a frequency of about 20 Hz or below. Further, the processing device can determine the positioning information by directionalizing the sensors towards the source.

Another exemplary embodiment discloses a system including a first sensor array disposed in a first geospatial location and configured to sense infrasound and generate one or more signals corresponding to sensed infrasound; and a processing device. The processing device is configured to receive the one or more signals, derive one or more timestamps for at least a subset of the one or more signals, detect one or more infrasound peaks in the one or more signals corresponding to sensed infrasound, and determine a first direction to a source of the sensed infrasound based on the one or more timestamps and the infrasound peaks.

In the embodiment, the first sensor array can be disposed in a first geospatial location. The first sensor array can include two or more sensor pairs, and the processing device can be configured to calculate: time-difference-of arrival (TDOA) information for sensed infrasound between each sensor pair in the first array; angle-of-arrival information for sensed infrasound between each sensor pair in the first array; and a first direction to a source of infrasound based on the TDOA information, the angle-of-arrival information, and a geometric configuration of the first array.

In the embodiment, the system can further include a second sensor array disposed in a second geospatial location and spatially apart from the first sensor array. The processing device can be configured to determine: a second direction to a source of the sensed infrasound based on one or more signals provided by the second sensor array and corresponding to sensed infrasound; and a third geospatial location for the source of the sensed infrasound based on the first direction, the first geospatial location, the second direction, and the second geospatial location. In the embodiment, the first sensor array can include at least three sensors.

Another exemplary embodiment discloses a method of geospatial positioning. The method includes arranging a plurality of sensors in a first array, sensing, by the plurality of sensors, one or more low frequency sounds from one or more sources, transmitting, to a processing unit, one or more signals including information corresponding to the one or more low frequency sounds from each sensor in the plurality of sensors, timestamping the one or more signals at predetermined time intervals, detecting, in the processing unit, the one or more low frequency sounds using the information in the one or more signals, and calculating, in the processing unit, a first geospatial location of the plurality of sensors based on the information in the one or more signals.

In the embodiment, the method can further include arranging at least a portion of the plurality of sensors in a second array spaced apart from the first array, and calculating, in the processing unit, a second geospatial location of the plurality of sensors based on the information in the one or more signals.

In the embodiment, the detecting the one or more low frequency sounds in the method can include detecting one or more signal peaks using the information in the one or more signals. The calculating a first geospatial location can include computing a TDOA between one or more sensor pairs in the plurality of sensors using the one or more signal peaks, computing an angle-of-arrival between one or more sensor pairs in the plurality of sensors using the information in the one or more signals, and generating compass bearings based on the first array of the plurality of sensors to provide an estimate of a compass direction to the one or more sources of low frequency sounds.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE INVENTION

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

It will be understood that when an element or layer is referred to as being "on", "connected to", or "coupled to" another element or layer, it can be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

In the drawings, the size and relative sizes of layers and regions may be exaggerated for clarity. Referring now to the drawings, and more particularly to FIGS. 1A through 5, where similar reference characters denote corresponding features consistently throughout, there are shown exemplary embodiments of systems and methods for using low frequency sounds for positioning purposes. For the sake of clarity, and where practical, reference character numbers followed by a letter denote features corresponding to similar features having reference characters without a letter described elsewhere in greater detail. In some embodiments, the low frequency sound includes sound at or about 200 Hz or below, such as 100 Hz and 50 Hz. In other embodiments, the low frequency sounds can be infrasounds, which can be at or about 25 Hz, 20 Hz, or below.

Figure 1A:
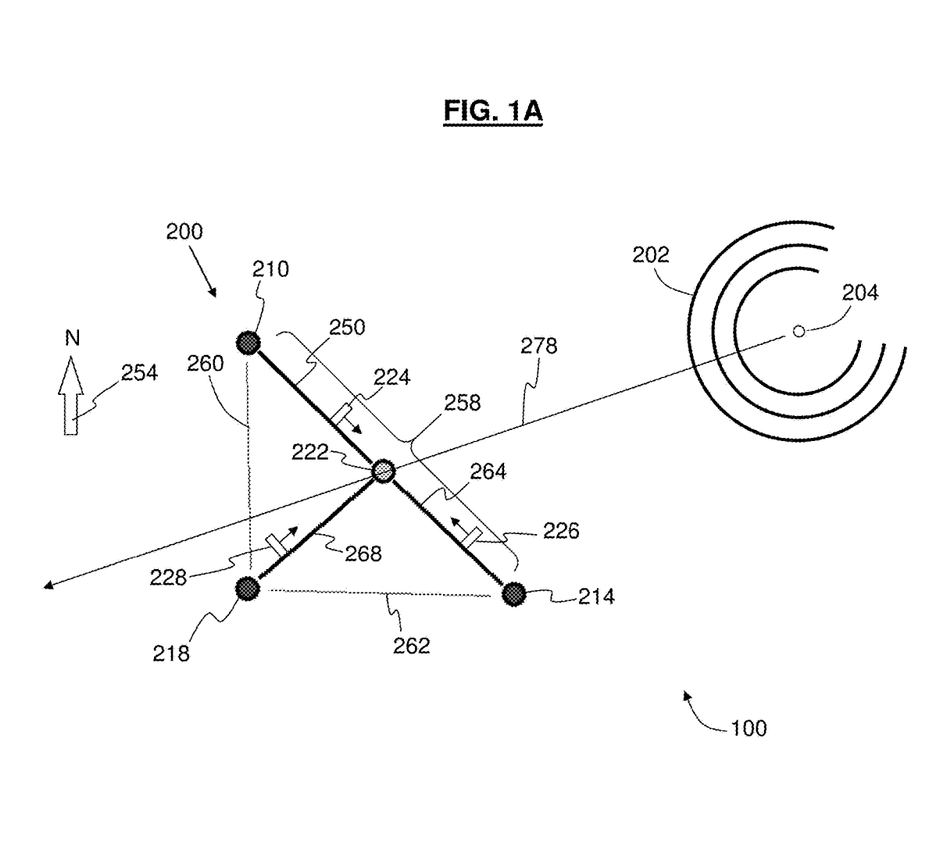
FIGS. 1A and 1B are schematic diagrams of a sensor array and a low frequency source according to an embodiment herein.
Figure 1B:
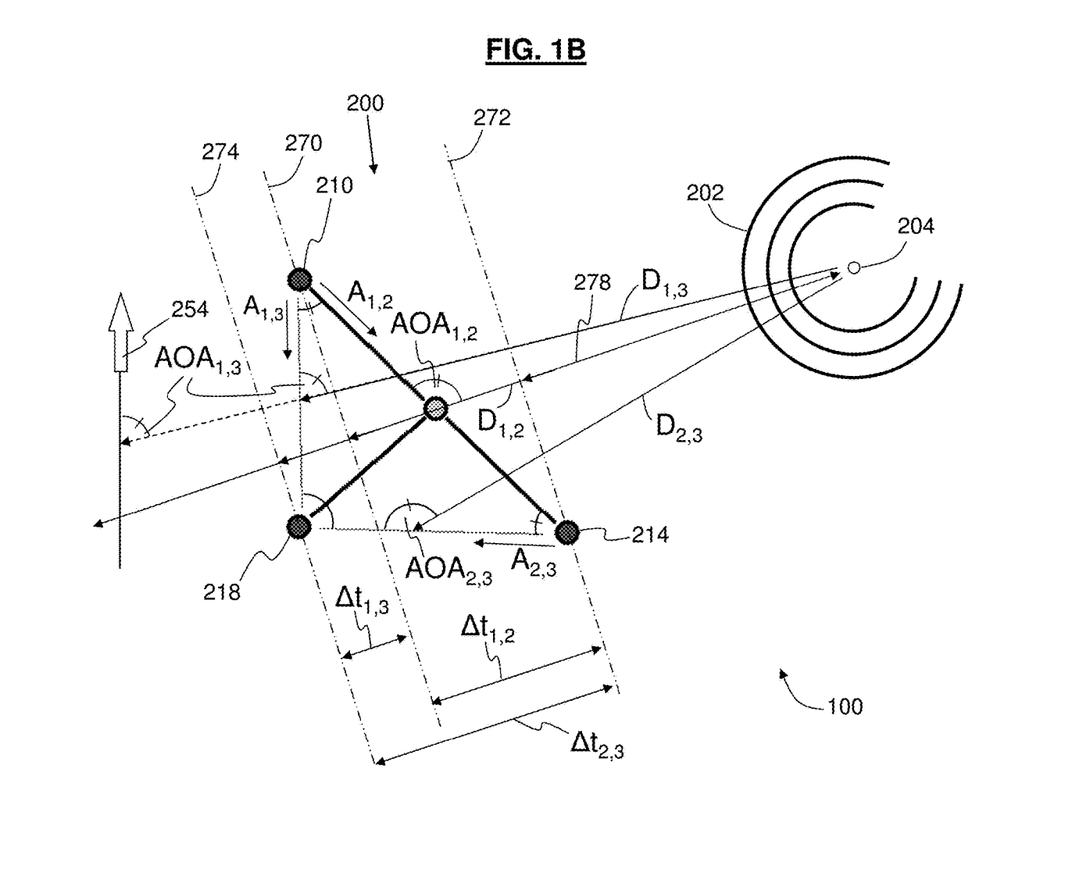

As illustrated in FIGS. 1A and 1B, a system 100 can be provided to detect low frequency sound 202 from a source 204 and determine positioning information, such as direction information from source 204. System 100 can include a sensor array 200, and source 204 can be capable of emitting one or more low frequency sounds, to include continuous sounds or time-limited sounds, such as low frequency impulse sounds. Sensor array 200 includes a first sensor 210, a second sensor 214, a third sensor 218, and a processing device (i.e., processor) 222. Sensors 210, 214, and 218 can be configured to sense low frequency sounds from source 204 and to transform sensed low frequency sound 202 into a first signal 224, a second signal 226, and a third signal 228, respectively, which can be provided to processing device 222. Signals 224, 226, and 228 can include information, such as data values, corresponding to the low frequency sound 202 being emitted from source 204 and sensed by sensors 210, 214, and 218. As illustrated in FIG. 1A, processing device 222 is in communication with sensors 210, 214, and 218. That is, processing device 222 is communicatively operable with sensors 210, 214, and 218, and is configured to receive the signals 224, 226, and 228. The processing device 222 can be further configured to determine positioning information corresponding to the geospatial location of sensors 210, 214, and 218 based at least in part on the information provided by signals 224, 226, and 228.

In one embodiment, each of the sensors 210, 214, 218 can be configured to sense low frequency sounds, such as those at or about 200 Hz or below. In other embodiments, the sensors 210, 214, 218 may be operable to sense infrasounds, which can be at or about 25 Hz or below. Sensors 210, 214, and 218 may be, for example, one or more of a pressure sensor, a microphone, or any combination thereof.

In one embodiment, sensors 210, 214, and 218 may be low-cost, commercially available differential air pressure sensors having a microbarograph design with solid-state differential pressure sensors and a high-pass pneumatic filter. A commercially available example is the Infiltec INFRA-20 Infrasound Monitor (INFILTEC, INC.) sensor. Sensors 210, 214, and 218 can each have a sampling rate for transforming sensed low frequency sounds into signals 224, 226, and 228, the sampling rate being used to develop information corresponding to what has been sensed. The sampling rates may vary, but in the exemplary embodiment, can be about 50 Hz. The sensitivity in sensors 210, 214, and 218 may also vary, but in the exemplary embodiment, the sensor resolution can be 0.01 microbar over a range of +/−20 Pascals.

In addition to sensing low frequency sounds, sensors 210, 214, and 218 can be configured to communicate with processing device 222 so that information corresponding to sensed low frequency sounds can be provided via signals 224, 226, and 228 over first communication cable 250, second communication cable 264, and third communication cable 268, respectively. In an exemplary embodiment, sensors 210, 214, and 218 can output to a serial cable having a USB-serial adapter for interfacing with processing device 222, which may be an ASIC, an FPGA, a microprocessor, or a general or special purpose computer, such as a laptop, a tablet, etc. In other embodiments, wireless communications can be used in place of any of communication cables 250, 264, and 268.

Figure 2A:
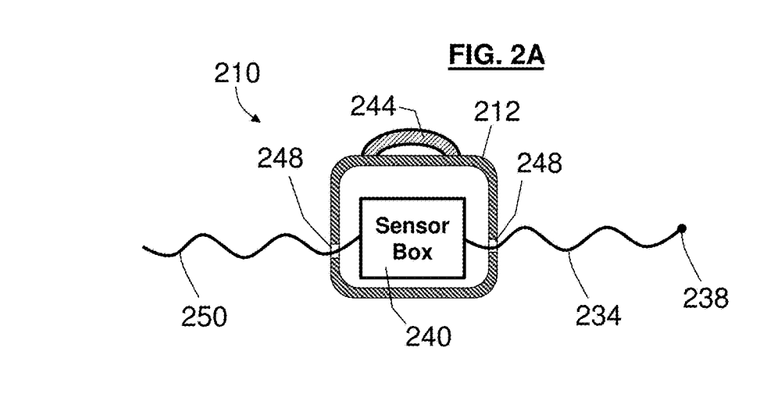
FIG. 2A is a schematic diagram showing a sensor in a configuration to sense a low frequency sound according to an embodiment herein.
Figure 2B:
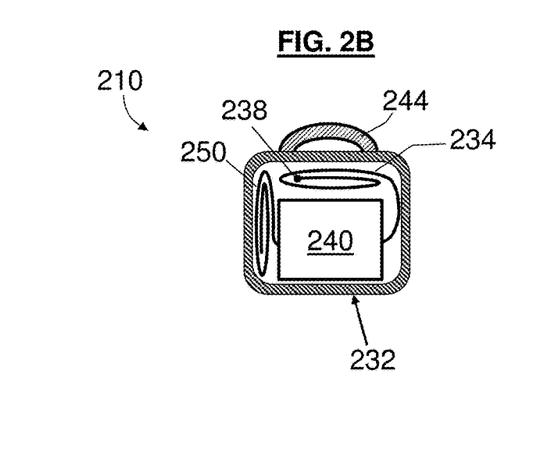
FIG. 2B is a schematic diagram showing a sensor in a stowed configuration for transport according to an embodiment herein.

Sensors 210, 214, and 218 may include additional features to protect them from physical impact, ambient conditions, or particular atmospheric effects, such as variations in temperature caused by sunlight, moisture, and the like. Such additional features are illustrated in FIGS. 2A and 2B where first sensor 210 is illustrated as having an atmospheric shield 212. The atmospheric shield 212 is described with reference to the first sensor 210 as representative, but second sensor 214 and third sensor 218 can also have such an atmospheric shield 212. In an exemplary embodiment, sensor 210 is equipped with a wind shield comprising a several-meter-long hose 234 having a foam tip 238 attached to one end of hose 234. Hose 234 can provide basic wind filtering, which can be enhanced or improved by a low frequency low attenuation filter like foam tip 238. In operation, hose 234 and foam tip 238 can filter from the low frequency sounds sensed by sensor 210 ambient wind noise that may interfere with the operation of system 100 or sensor 210. In other embodiments, atmospheric shield 212 may also, or in the alternative, include another form of wind shield, a moisture shield, a shock cushioning shield, a thermal shield, or a light shield.

Sensor 210 may also include an enclosable volume 232 or container—such as a thermally insulated bag, box, case, and the like—configured to stow a sensing portion 240 of sensor 210 during transport and operation. Enclosable volume 232 can also stow first communication cable 250 and the wind shield comprising the several-meter-long hose 234 having the foam tip 238 during transport. Such an enclosable volume 232 may provide one or more protective features, as well as other functions. In an exemplary embodiment, enclosable volume 232 comprises a small, portable, zip-up bag that provides thermal, wind, and physical protection. Enclosable volume 232 includes carrying handle 244 so that sensor 210 may be more easily transported. Hence, in an exemplary embodiment, sensors 210, 214, and 218 can be portable and can include an enclosable volume 232 configured to stow the sensing portion 240 during transport and operation.

An operational arrangement of sensor 210 is shown in FIG. 2A, where at least a portion of the atmospheric shield 212 is enclosable volume 232 and the wind shield comprising hose 234 and foam tip 238, which protrudes from the enclosable volume 232. Enclosable volume 232 may have one or more openings 248 that allow hose 234 and first communication cable 250 to protrude from the enclosable volume 232 while the sensing portion 240 remains protected within volume 232 from atmospheric conditions.

Again, with reference to FIG. 1A and the sensor array 200, it is noted that variations in the geometrical configuration of sensor array 200 are possible. In an exemplary embodiment, sensor array 200 includes sensors 210, 214, and 218 arranged in the shape of an isosceles triangle having first side 258 between first sensor 210 and second sensor 214, second side 260 between first sensor 210 and third sensor 218, and third side 262 between second sensor 214 and third sensor 218, wherein a right angle is formed between sides 260 and 262, and 45-degree angles are formed between sides 258 and 260 and sides 258 and 262. Sensor array 200 is arranged so that the second side 260 spanning from first sensor 210 to third sensor 218 is along a predetermined direction 254, and in the illustrated embodiment, is along due (magnetic) North. During setup, a standard field compass may be used to arrange sensor array 200 along the predetermined direction 254. Spacing between sensors 210, 214, 218, which as more fully explained below can be used for determining positioning information, and may be measured by known techniques and tools in the art, such as with a tape measure, a laser, or the like. In the exemplary embodiment, sides 260 and 262 can be at or about 35 meters each, although acceptable distances between sensors 210, 214, and 218 can range from about 20 meters to about 200 meters, for example, from about 20 meters to about 50 meters, or even from about 100 meters to about 200 meters. While not wishing to be bound by theory, in general, the larger the spatial separation between sensors 210, 214, and 218, the better the temporal resolution can be for time-difference-of arrival (TDOA) computations, which may improve directionality estimates of the system 100. When the spatial separation is greater than about 100 to about 200 meters, the temporal resolution may be improved; however, rapid deployment of the sensor array 200 may be decreased. In an exemplary embodiment, deploying sensor array 200 can include disposing sensors 210, 214, and 218 at a geospatial location, deploying the hose 234 from the enclosable volume 232 for each sensor 210, 214, and 218, and ensuring sensors 210, 214, and 218 are communicatively operable with processing device 222, such as by connecting communication cables 250, 264, and 268 to the processing device 222.

In system 100, the processing device 222 can be configured to receive the signals 224, 226, and 228 having information corresponding to a sensed low frequency sound. In some embodiments, information provided by signals 224, 226, and 228 can be provided simultaneously to processing device 222 during a predefined collection period. For example, when cables 250, 264, and 268 are all the same length, the data values can stream into the processing device 222 simultaneously and be timestamped by the processing device 222. In an alternative embodiment, where the lengths of cables 250, 264, and 268 may be different from one another, one or more of sensors 210, 214, and 218 may be wireless, or for any other reason, the sensors 210, 214, and 218 can timestamp the data values prior to streaming the data values to the processing device 222. Signals 224, 226, and 228 can be analog signals or digital signals, either of which can contain information that is indicative of a sensed low frequency sound. In an exemplary embodiment, the information provided by signals 224, 226, and 228 can include a plurality of data values derived from sampling the signals, which can be received by processing device 222 during a data collection period.

In an exemplary embodiment, sensors 210, 214, and 218 can be differential air pressure sensors that are operable to sense a low frequency sound and transform that sound into signals 224, 226, and 228. Information provided by signals 224, 226, and 228 can include a plurality of data values that can be derived from sampling the signals 224, 226, and 228, or can be embedded in signals 224, 226, and 228. Sampling can be performed at or about 50 Hz, or other suitable sampling frequency derived in part from the frequency of the low frequency sound to be sensed. It will be appreciated that Nyquist sampling principles and other suitable sampling techniques can be used. In the exemplary embodiment, processing device 222 can receive the plurality of data values provided by sensors 210, 214, and 218 via communication cables 250, 264, and 268, which can interface with processing device 222 via multiple serial ports, such as a USB port.

To manage data collection in the exemplary embodiment, a Python™ script may be used, but it will be appreciated that other scripts and programs can be used. In operation, the Python™ script can open the serial ports of the processing device 222 for a predetermined collection period and then read and/or record the information provided by sensors 210, 214, and 218 and signals 224, 226, and 228. Information in the exemplary embodiment includes a plurality of data values—such as an amplitude value, a frequency value, and a timestamp value—and processing device 222 is operable to record the values during a predetermined collection period in a text file for subsequent analysis to determine positioning information. Analysis as described herein may also be accomplished in near real-time, such that recording a plurality of values is optional. The Python™ script can close the serial ports upon completion of predetermined collection period.

In some embodiments, the script can synchronize the serial ports at periodic intervals to correct for any errors, such as what may be caused by time drift in the sensors 210, 214, and 218. To illustrate, time drift may be introduced by employing differing sampling rates at sensors 210, 214, and 218. Sampling for each sensor may approximate 50 Hz and still vary with or without control, that is, first sensor 210 may sample at 49.5 Hz while second sensor 214 may sample at 50.2 Hz. This de-synchronization between sensors 210 and 214 will accumulate with time resulting in a time drift in the plurality of data values. Periodically resynchronizing during the data collection period at predetermined intervals—such as every 3 seconds—can minimize this time drift. Pausing data collection, flushing the serial buffers, and resuming data collection over the predetermined collection period can resynchronize the serial ports. In other embodiments, resynchronization can occur between or at the beginning or end of the predetermined collection period.

Processing device 222 can be configured to process the information provided by signals 224, 226, and 228 to determine positioning information related to sensors 210, 214, and 218. In some embodiments, positioning information can include a direction to a low frequency source, a distance from a low frequency source, or a geospatial location relative to a low frequency source. In one embodiment, this positioning information can be based on the amplitude or frequency values and their corresponding timestamps as described more fully below. All or a subset of these values can be provided by sensors 210, 214, and 218. In the exemplary embodiment, sensors 210, 214, and 218 can provide amplitude values, whereas in other embodiments, sensors 210, 214, and 218 can provide either or both of a frequency value and a timestamp value. Processing device 222 can provide frequency values and timestamp values in the exemplary embodiment and record these values for processing to determine positioning information.

In the exemplary embodiment, processing device 222 can compute directionalization estimates between array 200 and source 204 using the amplitude values provided by sensors 210, 214, and 218 via signals 224, 226, and 228. More specifically, processing device 222 can be configured to use the amplitude value contained in the plurality of data values and provided as part of the information in signals 224, 226, and 228 to compute a time-difference-of arrival (TDOA) for each sensor pair in array 200, compute an angle-of-arrival estimate for each sensor pair, and generate compass bearing estimates based on the geometric configuration of sensor array 200 that estimate the direction of source 204. In other embodiments, directions to a low frequency source 204 can be provided and/or improved by accounting for one or more physical conditions, noise conditions, and environmental factors. Estimates can be improved, for example, by measuring and recording the geospatial locations of sensors 210, 214, and 218, and using these measurements to adjust the compass bearing estimates mentioned above and described more fully below. To adjust for noise conditions, any combination of low-pass, high-pass, or bandpass filtering operations can be performed to filter noise from the information provided by signals 224, 226, and 228. For instance, for simple high-pass filtering, a predetermined cut-off frequency can be used to define a high pass filter and applied through a Fourier transform analysis that converts time-domain values to frequency domain values. Values below the cut-off frequency can be re-written with zeros in memory, then the samples can be reconverted back into the time-domain via a reverse-Fourier transform analysis. Alternative methods of signal filtering are also possible. To adjust for environmental factors, one or more conditions of the physical environment that affect the propagation of low frequency sound can be accounted for by processing device 222.

Air temperature, for example, can influence the speed of sound, and thus may be accounted for when determining compass bearing estimates between sensor array 200 and source 204. Air temperature can be used to adjust a speedof-sound computation and stored as an input variable for use by processing device 222. Humidity may similarly be accounted for in determining compass bearing estimates. While not wishing to be bound by theory, it is appreciated that the speed of sound in air can be found for a measured air temperature by the Equation: c=Speed of sound in air (meters/second)=331.3+0.606*temperature (in degrees Celsius).

In the exemplary embodiment shown in FIGS. 1A and 1B, the geometrical configuration of array 200 can be used in part to determine compass bearing estimates. The geometrical configuration of array 200 can be provided to processor 222 by automatic range finders, a compass, or by a user through pre-defined configuration settings. For example, in the exemplary embodiment of FIG. 3, an R program 330 can default to a triangular configuration comprising three sensors. Predetermined directions from first sensor 210 to second sensor 214, and from first sensor 210 to third sensor 218, can be measured and the corresponding values can be entered into the R program 330. In the exemplary embodiment, the predetermined directions can be related to compass directions. The physical distance between first sensor 210 and second sensor 214 and between first sensor 210 and third sensor 218, can also be measured and used by processing device 222. Once these distances and directions have been determined, the distance and direction of the remaining triangle segment, second sensor 214 to third sensor 218, can be measured or computed. These "baseline" measurements can be stored as the following variables.

$A_{1,2}$=compass bearing from sensor 1 (210) to sensor 2 (214)

$A_{1,3}$=compass bearing from sensor 1 (210) to sensor 3 (218)

$A_{2,3}$=compass bearing from sensor 2 (214) to sensor 3 (218)

$B_{1,2}$=baseline distance (258) from sensor 1 (210) to sensor 2 (214)

$B_{1,3}$=baseline distance (260) from sensor 1 (210) to sensor 3 (218)

$B_{2,3}$=baseline distance (262) from sensor 2 (214) to sensor 3 (218).

In the exemplary embodiment, processing device 222 can use amplitude values provided in signals 224, 226, and 228 to determine positioning information, such as directional information, for array 200. The amplitude values may correspond to a low frequency sound 202, which may be a time limited sound, such as an impulse, emitted by source 204. The low frequency sound 202 can arrive at first sensor 210 denoted by dash-dot-dot line 270, at second sensor 214 denoted by dash-dot-dot line 272, and at third sensor 218 denoted by dash-dot-dot line 274. More specifically, low frequency sound 202 may arrive at second sensor 214 at time=$t_0$ (272), first sensor 210 at time=$t_0+\Delta t_{1,2}$ (270), and third sensor 218 at time=$t_0+\Delta t_{2,3}$ (274), as illustrated, and be transformed into signals 224, 226, and 228, respectively, and provided to processing device 222. Processing device 222 can identify, through processing of the amplitude values in signals 224, 226, and 228, the amplitude values that correspond to the low frequency sound 202. A variety of embodiments can be provided for processing the amplitude values to identify low frequency sound 202 and to provide compass bearing estimates between array 200 and source 204.

Figure 3:
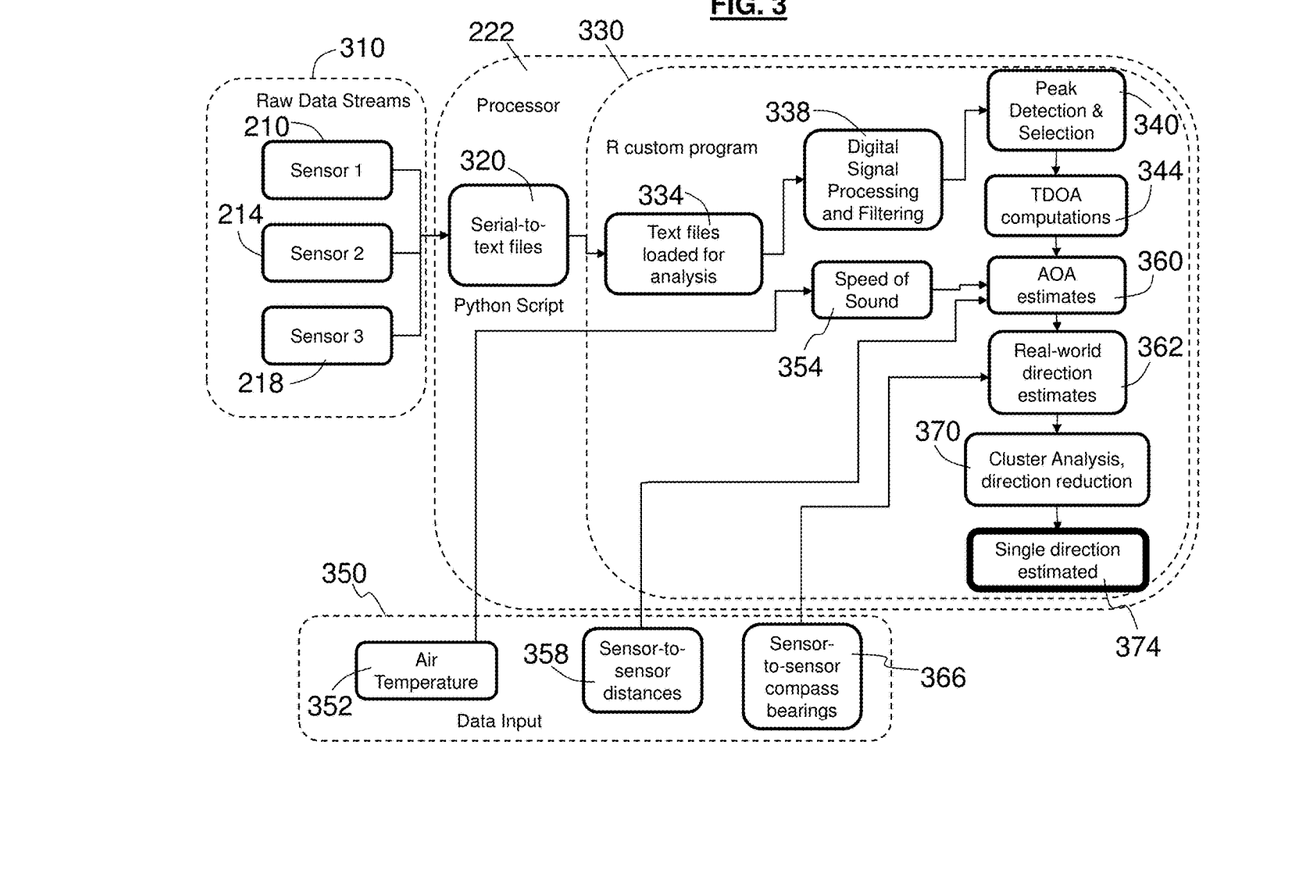
FIG. 3 illustrates a flow diagram for information processing flow to estimate a direction according to an embodiment herein.

For instance, directionalization computations can be performed when the peak amplitude values are identified in the information provided by sensors 210, 214, and 218, and TDOA computations can be made for each sensor pair using these amplitude values. In the exemplary embodiment, a program operable to perform the information processing flow in FIG. 3 can be used to identify peak amplitudes values in each of signals 224, 226, and 228. For instance, an R programming language program 330 or other programming language program can be used for this purpose and to perform one or more other functions of the information processing flow as illustrated in FIG. 3. In addition to amplitude values, inputs 350 into the R program 330 can include air temperature 352, sensor-to-sensor distances 358, and sensor-to-sensor compass bearings 366.

Finding peak amplitude values in the exemplary embodiment may include using one or more search parameters as part of a search algorithm, which may or may not be modifiable, to search for peak amplitude values that correspond to low frequency sound from the source 204. For example, when the signal of interest has a high intensity around 10 Hz, but there is substantial noise at 20 Hz, which is interfering with finding the peaks of the signal of interest, peak detection can be improved via frequency-filtering. In another embodiment, minimum or maximum toggle settings for peak amplitude identification can be used. A search algorithm can either look for the largest positive (maximum) or negative (minimum) values, because in some instances a low frequency sound may create a large positive pressure swing, but not a negative one, or vice versa. In one embodiment, a visual display (not shown) may also be provided to allow for peak amplitude values to be visually-identified, for noise levels to be assessed, and for assessing the needs for further filtering or windowing. When peak amplitude values are visually identified, they can be tagged as an indicator of a low frequency sound. In still another embodiment, a user-defined time window can be selected, wherein peak amplitude values are identified during a defined period.

Once the peak amplitude values associated with low frequency sound from the source 204 are identified, a time-difference-of arrival (TDOA) can be computed for each sensor pair, specifically first/second sensor pair 210/214; second/third sensor pair 214/218; and first/third sensor pair 210/218, in array 200. The TDOAs for each sensor pair can be used to compute angle-of-arrival estimates for each sensor pair, which can then be translated into compass bearing estimates between array 200 and source 204 based in part on the geometrical configuration of array 200. The compass bearing estimates from the sensor pairs can then be averaged, discarding three of the scattered readings and accepting the three "good" readings that are clustered together, thus providing a single compass bearing estimate between array 200 and source 204.

More specifically, TDOA systems can use the physics principle that velocity multiplied by time equals distance. The use of additional sensors and arbitrary or complex array geometry may provide more accuracy but with the increasing cost of computational complexity. In the exemplary embodiment, the three TDOAs for the three sensor pairs can be computed as follows:

$TDOA_{1,2}$=Time of Impulse Arrival at Sensor 1 (210)−Time of Impulse Arrival at Sensor 2 (214)($\Delta t_{1,2}$ in FIG. 1B);

$TDOA_{1,3}$=Time of Impulse Arrival at Sensor 1 (210)−Time of Impulse Arrival at Sensor 3 (218)($\Delta t_{1,3}$ in FIG. 1B); and $TDOA_{2,3}$=Time of Impulse Arrival at Sensor 2 (214)−Time of Impulse Arrival at Sensor 3 (218)($\Delta t_{2,3}$ in FIG. 1B).

From these three TDOAs, and with the use of the estimated speed of sound, three distances can be computed:

$$D_{1,2}=c*TDOA_{1,2};$$

$$D_{1,3}=c*TDOA_{1,3}; \text{ and}$$

$$D_{2,3}=c*TDOA_{2,3}.$$

These three distances can be used to compute six Angle-of-Arrival (AOA) estimates for each sensor baseline direction, two for each of the three sensor pairs:

$$AOA_{1,2}=+/-\arccos(D_{1,2}/B_{1,2});$$

$$AOA_{1,3}=+/-\arccos(D_{1,3}/B_{1,3}); \text{ and}$$

$$AOA_{2,3}=+/-\arccos(D_{2,3}/B_{2,3}).$$

These AOA estimates can be accounted for, along with the geometrical configuration of array 200, to arrive at compass bearing estimates between array 200 and source 204. That is, they can be added/subtracted from the corresponding angles between sensor pairs, compass bearings between sensors $A_{1,2}$, $A_{1,3}$, and $A_{2,3}$, to arrive at compass bearing estimates between array 200 and source 204.

Note that, using the above calculations, six possible angles are given as possible results. This is due to inherent ambiguity of the direction of arrival: any given TDOA for a sensor pair computationally generates two possible source directions, except in the rare case of a zero degree AOA. Assuming a single source, only one of those directions will be the 'true' source direction while the other will be incorrect. But with three pairs of sensors arranged having different baseline directions, the six estimates can show a cluster of three "correct" estimates indicating the true single source direction, while the other three estimates can be scattered separately from the cluster. Visual inspection of the estimates can be utilized by the user to discard the three incorrect estimates, or mathematical cluster analysis or other computational techniques can be used. Subsequent averaging of the three 'correct' estimates can result in one single estimate of the impulse source direction.

As shown in FIG. 3, raw data streams 310 from sensors 210, 214, and 218 can be input to the serial ports of processing device (i.e., processor) 222 and written to text files in operation 320, for example, using the Python™ script. The processor 222 can load the text files for analysis, for example, by an R program 330 in operation 334. Digital signal processing and filtering can occur in the processor 222 in operation 338, for example, by the R program 330. At operation 340, impulse peaks can be identified and selected and at operation 344, TDOA calculations can be executed. Data input 350 can include air temperature 352 input to a speed of sound calculation at operation 354 in the processor 222. Data input 350 can include sensor-to-sensor distance 358 that can be input to an angle of approach (AOA) estimate calculation 360 in the processor 222 with the speed of sound calculation 354 and the TDOA computations 344. The AOA refers to the direction of the low frequency sound or infrasound impulse approach 278 in FIGS. 1A and 1B when correlated to the real-world direction estimate in operation 362 including data input 350 of the sensor-to-sensor compass bearing 366. A cluster analysis can be performed by the processor 222 in operation 370 to reduce mathematical solutions and leading to a single direction estimate in operation 374.

In some embodiments, multiple sources of low frequency sounds may be provided. For example, referring to FIGS. 4A and 4B, localization schemes can be based on the number and types of sources 204a, 204b, and 204c, as described below in systems 100a (FIG. 4A) and 100b (FIG. 4B).

There are several different schemes that can be utilized to estimate a geospatial position of a sensor array 200a, 200b in the field relative to a source 204a at a known location, or relative to a plurality of sources 204b and 204c at known locations. Alternatively, the array 200a at a known location can be used to directionalize to source 204a, or 204b and 204c at unknown locations.

Figure 4A:
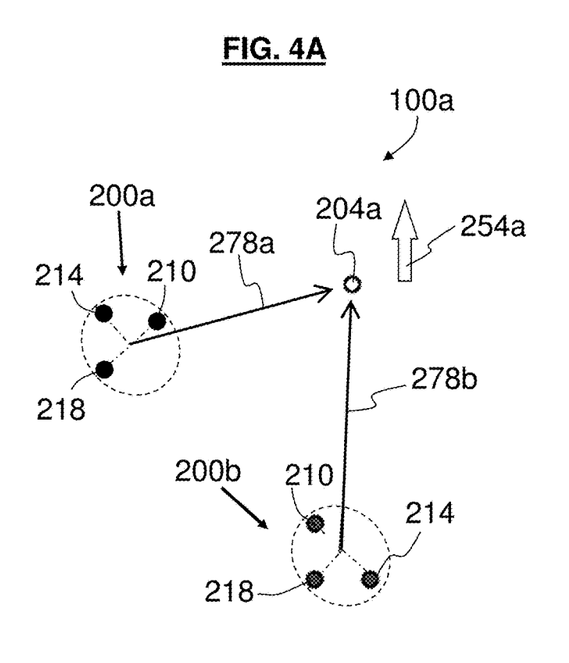
FIG. 4A is a schematic diagram of a sensor array and a low frequency source according to an embodiment herein.

In FIG. 4A, for positioning with only one source 204a at a known location, both a direction and a distance 278a, 278b can be estimated. Direction can be estimated using the array 200b oriented to a predetermined direction 254a as described above with respect to FIGS. 1A and 1B, for example, utilizing TDOA between sensors 210, 214, and 218. In addition, distance can be estimated by knowing the time that the impulse of low frequency sound 202 is emitted at the source 204a (time-synchronized) or when the source 204a and the array 200 are time-synchronized and able to communicate.

Figure 4B:
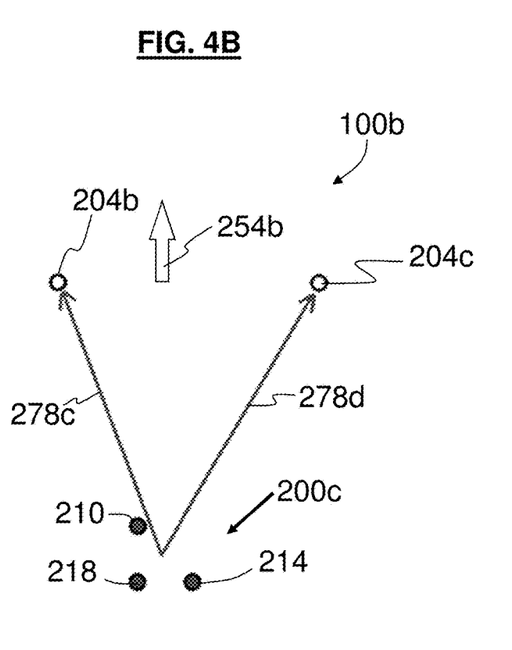
FIG. 4B is a schematic diagram of a sensor array and multiple sources of low frequency sounds according to an embodiment herein.

For positioning with two or more sources 204b and 204c at known locations, as shown in FIG. 4B, time synchronization between sources 204b and 204c and the array 200c may no longer be necessary, but may still be able to increase accuracy over non-time synchronized measurements. The array 200c oriented to a predetermined direction 254b can detect the directions 278c and 278d of the sources 204b and 204c, and compute a position via resectioning, for example, bi-angulation or tri-angulation.

Figure 5:
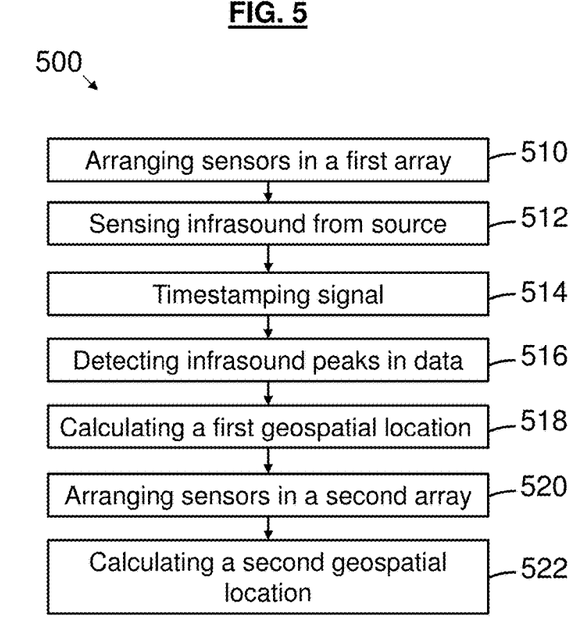
FIG. 5 is a flow diagram illustrating a method according to an embodiment herein.

According to another embodiment shown in the flow diagram of FIG. 5, with reference to FIGS. 1A through 4B, a method of geospatial positioning 500 is provided. The method includes arranging (510) sensors 210, 214, and 218 in a first array (first geometric configuration) 200a. The method includes sensing (512) infrasound from source 204 by sensors 210, 214, and 218, transmitting a data signal 224, 226, and 228 from each of the sensors 210, 214, and 218 in the first array 200 to a processing device 222. The signals 224, 226, and 228 include information corresponding to the sensed infrasound. The method includes timestamping (514) in the processing device 222 each signal 224, 226, and 228 at predetermined time intervals, detecting (516) in the processing device 222 infrasound peaks in each data signal 224, 226, and 228 corresponding to an infrasound impulse, and calculating (518) in the processing device 222 a first geospatial location of the plurality of sensors 210, 214, and 218 based on the signals 224, 226, and 228 from each of the sensors 210, 214, and 218.

In the embodiment, the method can further include arranging (520) the plurality of sensors 210, 214, and 218 in a second array 200b (second geometric configuration) spaced apart from the first array 200a. The method can include calculating (522) in the processing device 222 a second geospatial location of the plurality of sensors 210, 214, and 218 based on the signals 224, 226, and 228 from each of the sensors, 210, 214, and 218.

Here, the calculating at the first and second geospatial locations can include computing a time-difference-of arrival (TDOA) of the detected infrasound peaks for each pair of sensors $\Delta t_{1,2}$, $\Delta t_{1,3}$, $\Delta t_{2,3}$ in the sensors 210, 214, and 218, computing an angle-of-arrival (AOA) for each pair of sensors, and generating compass bearings based on the first and second arrays 200a, 200b of the plurality of sensors 210, 214, and 218 to provide an estimate of a compass direction to a source 204a of the detected infrasound peak, the compass directions being determined, for example, at the first geospatial location from the angle between the direction to the source 278a and the predetermined direction 254a. Further, calculating the first and second estimated geospatial locations may include additional navigational techniques, for example, dead reckoning prior to the first geospatial location, or between the first and second geospatial locations. For example, on land a direction and distance can be measured between the first and second geospatial locations.

Referring to FIGS. 1A, 1B, 4A, and 4B, methods of using the system 100 according to exemplary embodiments herein include a first positioning scheme when the position of the array 200 is unknown. The first scheme can include (a) using the system 100b for sensing the direction 278c and 278d to at least two spatially-separated infrasound sources (e.g., "emitters") 204b and 204c that have known positions, or (b) using the system 100 or 100a for sensing the direction and distance to only one source 204 or 204a at a known position.

Sensing the direction to at least two spatially-separated infrasound sources 204b and 204c that have known positions, can be performed by the principle of angulation, for example, bi-angulation in the case of two sources or triangulation in the case of three sources, etc. Sensing the direction and distance to only one source 204 or 204a at a known position can be estimated using the direction-finding capabilities of the array 200 or 200a, as already described with the distance between the array 200 or 200a and the source 204 or 204a estimated by measuring a time-of-flight (TOF) of the infrasound signal. TOF estimates can be implemented with temporal coordination (clock synchronization or time synchronization). TOF estimates can further use communication (information exchange) between the sensor array 200 or 200a and the source 204 or 204a to obtain a TOF. The time the low frequency sound 202 is emitted can be compared to the time of arrival of the sound at the sensors 210, 214, and 218 to determine a time of flight. An estimate for distance can be computed from the time-of-flight. In sum, for the first positioning scheme of estimating the geospatial location of the array 200, 200a, or 200c based in part on the known positions of one or more sources 204, 204a, or 204b and 204c can be used.

Methods of using system 100 according to exemplary embodiments herein include a second positioning scheme when the position of the array 200 is known. In the second positioning scheme, an unknown position of a source 204, 204a, or 204b and 204c using the direction-finding capability of the system 100, 100a, or 100b, respectively, can be found. In the second positioning scheme, (a) two spatially-separated arrays 200a and 200b at known locations can be used or (b) a single array 200 can be used by taking readings from different known locations, illustrated in FIG. 4A by arrays 200a and 200b. The positioning schemes are set forth in Table 1 and described in more detail below.

TABLE 1

| Scheme | No. of Arrays | No. of Sources | A Priori Known Position: | System Senses: | Estimate Position for: |
|---|---|---|---|---|---|
| 1(a) | 1 | 2 | Source | directions (2) | array |
| 1(b) | 1 | 1 | Source | direction + distance | array |
| 2(a) | 2 | 1 | Arrays | directions (2) | source |
| 2(b) | 1 | 1 | Array | directions (2+) | source |

Exemplary applied scenarios using each scheme:

Scheme 1(a). A user may be in poorly charted, uncharted, or unknown territory. There may be no clear landmarks in sight but an external verification on the user's position may be needed. Referring to FIG. 4B, the array 200c can be set up in the field oriented to predetermined direction 254b, and the system 100b can directionalize to known sources 204b and 204c at several known locations and several miles away. A first source 204b may emit impulses spaced seconds apart and a second source 204c may emit impulses spaced minutes apart. The array 200c can sense the sound impulses and the processor 222 can distinguish impulses from the first and second sources 204b and 204c and the processor 222 can identify the geospatial location of array 200c. The geospatial location of array 200c can be communicated to the user, for example, through a map display.

Scheme 1(b). User-alpha may be in poorly charted, uncharted or unknown territory. There may be no clear landmarks in sight but an external verification on their position may be needed. Referring to FIG. 4A, user-alpha can set up an infrasound field array 200a oriented to a predetermined direction 254a, and radio to user-bravo at source 204a, who may be an unknown distance away in an unknown direction from user-alpha. Over the radio, user-alpha and user-bravo can synchronize time, for example by synchronizing watches, and coordinate that user-bravo will emit an infrasound impulse at a predetermined time. When the infrasound impulse is sensed by the infrasound array 200a at user-alpha's position, the processing device 222 that is communicably operable with infrasound array 200a can use TOF and TDOA to compute the distance the sound traveled, as well as the direction of the emission 278a. The infrasound system 100a can determine the location of array 200a and user-alpha relative to source 204a, and communicate, such as through a display, the determined position to user-alpha. When a geospatial location of source 204a is known to processing device 222, the determined position of array 200a and user-alpha can be a geospatial location.

Scheme 2(a). Two users, user-bravo and user-delta, may be separated from each other by a few miles. User-bravo's and user-delta's locations may be generally known, and they may be searching for a low frequency sound source at an unknown location. Still referring to FIG. 4A, user-bravo and user-delta may each unpack and setup a sensor array 200a and 200b and processor 222 of an infrasound system 100a. Using each infrasound system 100a similar to infrasound system 100 (of FIGS. 1A and 1B), user-bravo and user-delta, can detect a low frequency sound emission from the source of interest 204a at an unknown location from two separate but known locations. Once detected, each infrasound system 100a can compute a line-of-bearing in the direction of the source 278a and 278b. Coordination of line-of-bearing 278a from user-bravo's known location and line-of-bearing 278b from user-delta's known location can determine the location of the previously unknown low frequency sound source 204a, for example, by translating the line-of-bearing 278a and line-of-bearing 278b to lines on a map that intersect to give the estimated position of the source of interest 204a.

Scheme 2(b). User-bravo, may be searching for an infrasound source at an unknown location. User-bravo may have a general understanding of his geospatial location. Still referring to FIG. 4A, user-bravo can unpack and set up a low frequency sound array 200b and processor 222 of a system 100a like system 100 illustrated in FIGS. 1A, 1B, 2A, 2B, 3, and 4A to sense the direction to a low frequency source 204a. User-bravo can move toward the source in the sensed direction, pausing occasionally to set up low frequency sound array 200a to take additional readings, in order to search for the source 204a. Alternatively, user-bravo may move the system to a different position, not toward the source, to take another measurement. Multiple measurements from different positions can provide the position of the previously unknown source 204a.

As described, a portable infrasound tactical field array capable of direction finding to one or more impulsive infrasound sources is provided. When used in conjunction with one or more source emitters from known positions, a current position estimate of the field array can be provided. The sensors can be small and lightweight to provide rapid set-up and tear-down of the system, allowing the array to be used tactically in the field at various times when position updates are desired, or when direction-finding to impulsive sources is desired.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A system, comprising:
   at least one source configured to emit one or more low frequency sounds;
   a plurality of sensors configured to sense the one or more low frequency sounds and to transform the one or more low frequency sounds into one or more signals comprising a plurality of data values; and
   a processing device communicatively operable with the plurality of sensors and configured to receive the one or more signals and to determine positioning information of said plurality of sensors based on the plurality of data values.

2. The system of claim 1, wherein the one or more low frequency sounds have a frequency of about 200 Hz or below.

3. The system of claim 1, wherein said plurality of sensors comprise at least three sensors.

4. The system of claim 1, wherein said plurality of sensors comprise one or more of a pressure sensor, a microphone, and a combination thereof.

5. The system of claim 1 wherein the at least one source is at a first geospatial location and said positioning information comprises any of a direction to and a distance from the first geospatial location.

6. The system of claim 1, wherein at least one of the sensors comprises an atmospheric shield.

7. The system of claim 6, wherein said atmospheric shield comprises any of a wind shield, a moisture shield, a cushioning shield, a thermal shield, and a light shield.

8. The system of claim 6, wherein at least one of the sensors is portable and comprises an enclosable volume configured to stow said sensor during transport, and wherein said atmospheric shield comprises a hose and a foam tip configured to protrude from said enclosable volume during operation.

9. The system of claim 1, wherein said processing device is configured to:
   receive said one or more signals during a predefined collection period;
   derive one or more of amplitude and frequency values from the plurality of data values;
   record a timestamp for at least a subset of the one or more of amplitude and frequency values; and
   determine positioning information based on the timestamps and the one or more amplitude and frequency values.

10. The system of claim 9, wherein said plurality of sensors comprises a plurality of sensor pairs, and wherein said processing device is configured to compute one or more of the following:
    a time-difference-of arrival (TDOA) for at least one pair of sensors in said plurality of sensor pairs;
    an angle-of-arrival estimate for at least one pair of sensors in said plurality of sensor pairs; and
    compass bearings to the at least one source based on a geometric configuration of said plurality of sensors to provide an estimate of said at least one low frequency sound source compass direction.

11. The system of claim 1, wherein the one or more low frequency sounds is an infrasound having a frequency of about 20 Hz or below.

12. The system of claim 11, wherein said processing device determines said positioning information by directionalizing said plurality of sensors towards said at least one source.

13. A system comprising:
    a first sensor array disposed in a first geospatial location and configured to sense infrasound and generate one or more signals corresponding to sensed infrasound; and
    a processing device configured to:
       receive said one or more signals,
       derive one or more timestamps for at least a subset of said one or more signals,
       detect one or more infrasound peaks in said one or more signals corresponding to sensed infrasound, and
       determine a first direction to a source of the sensed infrasound based on said one or more timestamps and said infrasound peaks, wherein said processing device is configured to calculate time-difference-of arrival (TDOA) information for sensed infrasound between each sensor pair in said first array, and angle-of-arrival information for sensed infrasound between each sensor pair in said first array; and
       a first direction to a source of infrasound based on the TDOA information, the angle-of-arrival information, and a geometric configuration of said first array.

14. The system of claim 13, further comprising a second sensor array disposed in a second geospatial location and spatially apart from said first sensor array, wherein said processing device is configured to determine:
    a second direction to a source of the sensed infrasound based on one or more signals provided by the second sensor array and corresponding to sensed infrasound; and
    a third geospatial location for said source of said sensed infrasound based on said first direction, said first geospatial location, said second direction, and said second geospatial location.

15. The system of claim 14, wherein the first sensor array comprises at least three sensors.

16. A method of geospatial positioning, said method comprising:
    arranging a plurality of sensors in a first array;
    sensing, by said plurality of sensors, one or more low frequency sounds from one or more sources;
    transmitting, to a processing unit, one or more signals comprising information corresponding to said one or more low frequency sounds from each sensor in said plurality of sensors;

timestamping the one or more signals at predetermined time intervals;

detecting, in said processing unit, the one or more low frequency sounds using said information in the one or more signals; and calculating, in said processing unit, a first geospatial location of said plurality of sensors based on said information in the one or more signals.

17. The method of claim 16, further comprising:

arranging at least a portion of said plurality of sensors in a second array spaced apart from said first array; and calculating, in said processing unit, a second geospatial location of said plurality of sensors based on said information in the one or more signals.

18. The method of claim 16, wherein detecting the one or more low frequency sounds comprises detecting one or more signal peaks using said information in the one or more signals, and wherein calculating a first geospatial location comprises:

computing a time-difference-of arrival (TDOA) between one or more sensor pairs in the plurality of sensors using said one or more signal peaks;

computing an angle-of-arrival between one or more sensor pairs in the plurality of sensors using said information in the one or more signals; and generating compass bearings based on said first array of said plurality of sensors to provide an estimate of a compass direction to the one or more sources of low frequency sounds.

* * * * *